US012147559B1

(12) United States Patent
Rangappa et al.

(10) Patent No.: US 12,147,559 B1
(45) Date of Patent: Nov. 19, 2024

(54) SECURE GEOLOCATION-BASED DATA ACCESS CONTROL IN A DISTRIBUTED COMPUTING ENVIRONMENT

(71) Applicant: FMR LLC, Boston, MA (US)

(72) Inventors: Umesh Bangalore Rangappa, Bengaluru (IN); Krishnaraj Sooji, Bengaluru (IN); Prabhu Karthik Ganesan, Bengaluru (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/399,972

(22) Filed: Dec. 29, 2023

(51) Int. Cl.
*G06F 21/62* (2013.01)
*H04L 9/40* (2022.01)

(52) U.S. Cl.
CPC .......... *G06F 21/6227* (2013.01); *H04L 63/08* (2013.01); *H04L 63/107* (2013.01)

(58) Field of Classification Search
CPC .... G06F 21/6227; H04L 63/08; H04L 63/107
See application file for complete search history.

(56) References Cited

U.S. PATENT DOCUMENTS

| | | | | |
|---|---|---|---|---|
| 7,797,132 B1 * | 9/2010 | Lele | .................... | G01S 19/03 |
| | | | | 702/182 |
| 7,870,614 B1 * | 1/2011 | Duhaime | .............. | G06F 21/602 |
| | | | | 713/192 |
| 8,024,339 B2 * | 9/2011 | Barker | ................ | G06F 21/6245 |
| | | | | 707/736 |
| 9,087,216 B2 | 7/2015 | LaFever et al. | | |
| 9,298,914 B1 * | 3/2016 | McCorkendale | ..... | G06F 21/552 |
| 9,514,333 B1 * | 12/2016 | Patel | ................... | G06Q 30/016 |
| 9,681,265 B1 * | 6/2017 | Davis | ..................... | G06F 16/29 |
| 10,051,451 B1 * | 8/2018 | Ray | ........................ | H04W 4/90 |
| 10,205,708 B1 * | 2/2019 | Fletcher | .............. | G06F 16/9535 |
| 10,284,885 B1 * | 5/2019 | Borras | .................... | G06F 21/10 |
| 10,331,895 B1 * | 6/2019 | Roth | .................... | G06F 21/6209 |
| 10,387,206 B2 * | 8/2019 | Rivas | .................. | H04M 7/0045 |
| 10,657,273 B2 | 5/2020 | Erickson et al. | | |
| 10,824,703 B1 * | 11/2020 | Desai | .................... | G06V 40/70 |
| 11,044,257 B1 * | 6/2021 | Heuts | ................... | H04L 63/108 |
| 11,218,307 B1 * | 1/2022 | Griffin | ................. | H04L 9/0643 |
| 11,282,174 B1 * | 3/2022 | DeMaio | ................... | G06T 5/70 |
| 11,487,902 B2 | 11/2022 | Ardhanari et al. | | |

(Continued)

*Primary Examiner* — Aravind K Moorthy
(74) *Attorney, Agent, or Firm* — Cesari and McKenna, LLP (57) ABSTRACT

Methods and systems for secure geolocation-based data access control include a server that captures a data access request from a remote device and determines whether the requestor geolocation corresponds to a non-restricted zone or a restricted zone. The server determines whether the requestor identity has permission to receive a full view or a masked view of data. The server retrieves data responsive to the data query and generates a response to the data access request, the response including a full view or a masked view of the retrieved data. When the generated response comprises a masked view, the server determines that the user of the remote device has requested a full view of the responsive data, authenticates the remote device using the requestor identity, and updates the generated response to comprise the full view of the retrieved data. The server device transmits the generated response to the remote device.

26 Claims, 6 Drawing Sheets

(56) References Cited

U.S. PATENT DOCUMENTS

| | | | | |
|---|---|---|---|---|
| 11,531,846 B1* | 12/2022 | Bodapati | | G06N 20/00 |
| 11,539,709 B2* | 12/2022 | Bhaskar S | | H04L 63/102 |
| 11,734,712 B2* | 8/2023 | Shim | | G06Q 30/0246 |
| | | | | 705/14.45 |
| 11,755,690 B1* | 9/2023 | Margolin | | G06F 18/24 |
| | | | | 707/723 |
| 11,783,078 B1* | 10/2023 | Li | | G06F 21/6227 |
| | | | | 726/1 |
| 11,818,111 B1* | 11/2023 | Debolt | | G06N 3/006 |
| 11,870,764 B1* | 1/2024 | Cheng | | H04L 63/102 |
| 11,899,814 B1* | 2/2024 | Hustad | | G06F 21/6218 |
| 11,899,824 B1* | 2/2024 | Hall | | G06F 21/6254 |
| 11,921,877 B2* | 3/2024 | Bayon | | G06F 21/6227 |
| 11,921,878 B2* | 3/2024 | Kayyoor | | G06F 16/2282 |
| 11,921,891 B2* | 3/2024 | Hatcher | | G06F 21/6254 |
| 11,929,937 B2* | 3/2024 | Marshall | | H04L 47/70 |
| 2004/0122789 A1* | 6/2004 | Ostertag | | G06F 9/451 |
| 2007/0006287 A1* | 1/2007 | Noda | | H04L 63/08 |
| | | | | 726/4 |
| 2007/0300306 A1* | 12/2007 | Hussain | | G06F 21/6227 |
| | | | | 726/27 |
| 2009/0007278 A1* | 1/2009 | Yano | | H04W 4/023 |
| | | | | 726/27 |
| 2009/0282464 A1* | 11/2009 | Bauchot | | G06Q 20/3674 |
| | | | | 726/5 |
| 2010/0023303 A1* | 1/2010 | Smith | | F17D 5/00 |
| | | | | 702/188 |
| 2010/0241844 A1* | 9/2010 | Hussain | | G06F 21/6218 |
| | | | | 713/150 |
| 2011/0047473 A1* | 2/2011 | Hanna | | G06F 9/541 |
| | | | | 715/740 |
| 2012/0056715 A1* | 3/2012 | Rajagopal | | G08C 17/02 |
| | | | | 340/8.1 |
| 2012/0151597 A1* | 6/2012 | Gupta | | G06F 21/6254 |
| | | | | 726/26 |
| 2012/0169541 A1* | 7/2012 | Singh | | G01S 1/02 |
| | | | | 342/417 |
| 2013/0318589 A1* | 11/2013 | Ford | | H04L 63/10 |
| | | | | 726/7 |
| 2014/0047234 A1* | 2/2014 | Davis | | G06Q 10/10 |
| | | | | 713/160 |
| 2014/0259094 A1* | 9/2014 | Narayanaswamy | | |
| | | | | H04L 63/1425 |
| | | | | 726/1 |
| 2014/0304836 A1* | 10/2014 | Velamoor | | G06F 21/6209 |
| | | | | 726/28 |
| 2014/0359723 A1* | 12/2014 | Hake | | H04L 63/08 |
| | | | | 726/5 |
| 2015/0074762 A1* | 3/2015 | Yang | | G06F 21/34 |
| | | | | 726/4 |
| 2015/0082152 A1* | 3/2015 | Bougon | | G06F 16/972 |
| | | | | 715/236 |
| 2015/0379344 A1* | 12/2015 | Haas | | G06T 7/0002 |
| | | | | 382/113 |
| 2016/0021081 A1* | 1/2016 | Caceres | | G06F 21/32 |
| | | | | 726/7 |
| 2016/0277368 A1* | 9/2016 | Narayanaswamy | | |
| | | | | G06F 21/6209 |
| 2016/0308865 A1* | 10/2016 | Poli | | H04L 63/0876 |
| 2017/0048272 A1* | 2/2017 | Yamamura | | H04L 63/10 |
| 2017/0083985 A1* | 3/2017 | Lacoss-Arnold | | |
| | | | | G06Q 20/4016 |
| 2017/0094470 A1* | 3/2017 | Venkatraman | | H04W 4/025 |
| 2017/0104756 A1 | 4/2017 | Rosenthal et al. | | |
| 2017/0111763 A1* | 4/2017 | Morgan | | H04B 7/0636 |
| 2017/0126710 A1* | 5/2017 | De-Levie | | H04L 63/1425 |
| 2017/0155655 A1* | 6/2017 | Spaulding | | H04L 9/3226 |
| 2017/0180313 A1* | 6/2017 | Isbister | | H04W 4/23 |
| 2017/0220813 A1* | 8/2017 | Mullins | | G06F 16/93 |
| 2017/0230256 A1* | 8/2017 | Urbach | | H04L 41/50 |
| 2017/0243020 A1* | 8/2017 | Dhondse | | H04W 12/08 |
| 2017/0264640 A1* | 9/2017 | Narayanaswamy | | G06F 16/285 |
| 2017/0353477 A1* | 12/2017 | Faigon | | G06F 21/554 |
| 2017/0366938 A1* | 12/2017 | Wootton | | H04B 17/27 |
| 2017/0372046 A1* | 12/2017 | Thomee | | H04L 63/0442 |
| 2018/0019959 A1* | 1/2018 | Shing | | H04W 12/033 |
| 2018/0020001 A1* | 1/2018 | White | | G06F 21/602 |
| 2018/0124191 A1* | 5/2018 | Nandi | | H04L 67/535 |
| 2018/0357440 A1* | 12/2018 | Brady | | H04L 63/08 |
| 2019/0238719 A1* | 8/2019 | Alameh | | G06V 40/172 |
| 2019/0304529 A1* | 10/2019 | Wootton | | G11C 11/2259 |
| 2019/0356499 A1* | 11/2019 | Demonsant | | H04L 63/08 |
| 2019/0392475 A1* | 12/2019 | Woodbury, Jr. | | G06Q 20/4014 |
| 2019/0394042 A1* | 12/2019 | Peddada | | H04L 9/0894 |
| 2020/0073011 A1* | 3/2020 | Abboud | | G08B 13/184 |
| 2020/0213114 A1* | 7/2020 | Sarin | | H04L 63/08 |
| 2020/0242269 A1* | 7/2020 | Narayanaswamy | | G06F 21/88 |
| 2020/0311304 A1* | 10/2020 | Parthasarathy | | G06F 11/3006 |
| 2020/0314133 A1* | 10/2020 | Singh | | G06F 21/604 |
| 2020/0413491 A1* | 12/2020 | Ansley | | H04W 92/02 |
| 2021/0097188 A1 | 4/2021 | Findlay et al. | | |
| 2021/0182439 A1* | 6/2021 | Singh | | G06F 21/6245 |
| 2021/0182787 A1* | 6/2021 | Mouli | | G06Q 10/0838 |
| 2021/0293974 A1* | 9/2021 | Peterson | | G01S 19/33 |
| 2021/0314905 A1* | 10/2021 | Rankin | | H04W 4/021 |
| 2021/0342842 A1* | 11/2021 | Gilbey | | G06Q 30/018 |
| 2022/0012668 A1* | 1/2022 | Kraus | | H04L 9/3239 |
| 2022/0043935 A1* | 2/2022 | Brannon | | G06F 16/335 |
| 2022/0050919 A1* | 2/2022 | Childress | | G06F 21/6245 |
| 2022/0198059 A1* | 6/2022 | Hatcher | | H04L 9/0643 |
| 2022/0269694 A1* | 8/2022 | Burnett | | G06F 16/2358 |
| 2022/0327231 A1 | 10/2022 | Hay et al. | | |
| 2022/0337902 A1* | 10/2022 | Tian | | G06V 20/52 |
| 2023/0034773 A1* | 2/2023 | Wang | | G06F 3/14 |
| 2023/0066476 A1* | 3/2023 | Ludwig | | G01C 21/3602 |
| 2023/0084264 A1* | 3/2023 | Karri | | G03H 1/2249 |
| | | | | 359/2 |
| 2023/0092670 A1* | 3/2023 | Montague | | G01S 19/40 |
| | | | | 342/357.23 |
| 2023/0099619 A1* | 3/2023 | Howald | | H04L 63/08 |
| | | | | 726/3 |
| 2023/0195934 A1* | 6/2023 | Gustof | | G06F 21/6245 |
| | | | | 726/26 |
| 2023/0214517 A1* | 7/2023 | Mohanty | | G06N 10/40 |
| | | | | 726/26 |
| 2023/0237195 A1* | 7/2023 | Noon | | G06F 21/6254 |
| | | | | 726/4 |
| 2023/0262053 A1* | 8/2023 | Nilgiri | | H04L 63/107 |
| | | | | 726/6 |
| 2023/0291548 A1* | 9/2023 | Mastenbrook | | H04L 9/3265 |
| 2023/0297702 A1* | 9/2023 | Fedorov | | G06F 21/62 |
| | | | | 713/168 |
| 2023/0306000 A1* | 9/2023 | Greehy | | G06F 21/6218 |
| 2023/0315893 A1* | 10/2023 | Levandoski | | G06F 16/25 |
| | | | | 726/27 |
| 2023/0325523 A1* | 10/2023 | Tommasi | | G06F 21/6227 |
| | | | | 726/1 |
| 2023/0334169 A1* | 10/2023 | De Paepe | | G06F 21/6254 |
| 2023/0359771 A1* | 11/2023 | Luo | | G16H 30/20 |
| 2023/0379409 A1* | 11/2023 | Plain | | G10L 15/063 |
| 2023/0409160 A1* | 12/2023 | Han | | G06F 3/0481 |
| 2023/0419167 A1* | 12/2023 | Nair | | G06N 3/006 |
| 2024/0005555 A1* | 1/2024 | Staats | | G01S 15/08 |
| 2024/0012931 A1* | 1/2024 | Yannuzzi | | G06F 21/51 |
| 2024/0037270 A1* | 2/2024 | Chung | | G06F 21/6254 |
| 2024/0078522 A1* | 3/2024 | Price | | G06Q 20/065 |
| 2024/0078557 A1* | 3/2024 | Ho | | G06Q 40/10 |
| 2024/0086566 A1* | 3/2024 | Lim | | H04L 9/32 |
| 2024/0086568 A1* | 3/2024 | Fleischer | | G06F 21/6245 |
| 2024/0089537 A1* | 3/2024 | Shanmugam | | H04L 65/403 |

* cited by examiner

```
{ "responseTime": 1698, "totalNoOfAccts": 7,
"rowData": [ { "rowtype": "ACCOUNT", "actNum": "X2939211l",
"actNam": "Individual*Cash*", "sym": { "name":
"Individual*Cash*X2939211l" }, "meta": { "acctActns": { "actNum":
"X2939211l" }, "isMgDivs": true },
"rowId": 1, "acctType": "Brokerage", "isAcctBasketEligible":
false }, { "rowType": "POSITION", "actNum": "X2939432l",
"actNam": "Individual*Cash*", "meta": { "acctType": "Brokerage",
"rowId": 2, "securityType": "Equity", "isUnPriced": true,
"cstbasType": "Fidelity", "holdingType": "Cash",
"isEligibleforLots": true, "isIWS": false}, "sym": {
"name": "ASMKJ", "cusip": "N07059432", "desc": "ASMKJ HOLDING NV
ISIN" }, "qty": { "val": 3, "disp": "3" ), "actPer": { "val":
3.642, "disp": "3.64%" ), "lstPrc": { "val": 610.3525, "disp":
"$610.3525" }, "lstPrChg": { "val": 0, "disp": "$0.00" ),
"fifTwo": { "low": ( "val": 355.8, "disp": "$355.80" }

...
}
```

*Before Data Masking*

```
{ "responseTime": 1698, "totalNoOfAccts": 7,
"rowData": [ { "rowtype": "ACCOUNT", "actNum": "##*##2111",
"actNam": "Individual*Cash*", "sym": { "name":
"Individual*Cash[##*##2111]" }, "meta": { "acctActns": { "actNum":
"##*##2111", "isMgDivs": true },
"rowId": 1, "acctType": "Brokerage", "isAcctBasketEligible":
false}, { "rowType": "POSITION", "actNum": "##*##4321",
"actNam": "Individual*Cash*", "meta": { "acctType": "Brokerage",
"rowId": 2, "securityType": "Equity", "isUnPriced": true,
"cstbasType": "Fidelity", "holdingType": "Cash",
"isEligibleforLots": true, "isIWS": false}, "sym": {
"name": "ASMKJ", "cusip": "N07059432", "desc": "ASMKJ HOLDING NV
ISIN" }, "qty": { "val": 3, "disp": "3" ), "actPer": { "val":
3.64%", "disp": "3.64%" ), "lstPrc": { "val": 610.3525, "disp":
"$610.3525" }, "lstPrChg": { "val": 0, "disp": "$0.00" ),
"fifTwo": { "iow": { "val": 355.8, "disp": "$355.80" }

...
}
```

402

*After Data Masking*

SECURE GEOLOCATION-BASED DATA ACCESS CONTROL IN A DISTRIBUTED COMPUTING ENVIRONMENT

TECHNICAL FIELD

This application relates generally to methods and apparatuses, including computer program products, for secure geolocation-based data access control in a distributed computing environment.

BACKGROUND

Maintaining the security and privacy of sensitive data (e.g., personally-identifiable information (PII), financial data) has become a critical priority for companies around the world. Implementing technical controls to protect this data from unauthorized access, while also ensuring the availability of such data to authorized personnel is even more challenging in view of ongoing regulatory changes, evolving governmental policies, and increased pressure from automated data gathering systems like screen scrapers and aggregators.

To minimize the risk of exposing sensitive data, organizations must continually update their systems via technical enhancements to apply necessary data access controls. However, the rapid cadence of these changes frequently results in unavailability of application features which customers and employees (particularly those located in restricted locations) rely upon. In addition, aggregators and screen scrapers continue to develop ways to avoid data access controls.

SUMMARY

Therefore, what is needed are computerized methods and systems that overcome the above challenges of existing data access control systems by dynamically applying access controls to sensitive data requests based upon the identity and the geolocation of the device/user that is requesting the data. The techniques described herein advantageously provide for the identification of existing restrictions on the geolocation from where the data-serving application/platform is accessed, as well as the identity and access permissions of the requestor, in order to implement precise data security controls designed to protect sensitive data from unauthorized exposure—such as masking sensitive data during the generation of a response. In addition, the methods and systems deploy a multifactor authentication layer to confirm that a requesting device is entitled to view the requested data without limitation. These improvements provide a significant benefit to organizations that utilize sensitive data in daily operations-both in cost savings from reduced risk of data loss, and deployment of applications/platforms that are compliant with regulatory requirements.

The invention, in one aspect, features a system for secure geolocation-based data access control in a distributed computing environment. The system includes a server computing device having a memory for storing computer-executable instructions and a processor that executes the computer-executable instructions. The server computing device captures a data access request from a remote computing device via a first communication channel, the data access request including a data query, a requestor geolocation, and a requestor identity corresponding to a user of the remote computing device. The server computing device determines whether the requestor geolocation corresponds to a non-restricted zone or a restricted zone. The server computing device determines whether the requestor identity has permission to receive a full view or a masked view of data responsive to the data query. The server computing device retrieves data responsive to the data query. The server computing device generates a response to the data access request, the response including a full view of the retrieved data when the requestor geolocation corresponds to a non-restricted zone and the requestor identity has permission to receive the full view, or a masked view of the retrieved data when the requestor geolocation corresponds to a restricted zone or the requestor identity has permission to receive the masked view. When the generated response comprises a masked view of the retrieved data, the server computing device determines that the user of the remote computing device has requested a full view of the responsive data, authenticates the remote computing device using the requestor identity via a second communication channel, and updates the generated response to comprise the full view of the retrieved data upon successful authentication of the remote computing device. The server computing device transmits the generated response to the remote computing device.

The invention, in another aspect, features a computerized method of secure geolocation-based data access control in a distributed computing environment. A server computing device captures a data access request from a remote computing device via a first communication channel, the data access request including a data query, a requestor geolocation, and a requestor identity corresponding to a user of the remote computing device. The server computing device determines whether the requestor geolocation corresponds to a non-restricted zone or a restricted zone. The server computing device determines whether the requestor identity has permission to receive a full view or a masked view of data responsive to the data query. The server computing device retrieves data responsive to the data query. The server computing device generates a response to the data access request, the response including a full view of the retrieved data when the requestor geolocation corresponds to a non-restricted zone and the requestor identity has permission to receive the full view, or a masked view of the retrieved data when the requestor geolocation corresponds to a restricted zone or the requestor identity has permission to receive the masked view. When the generated response comprises a masked view of the retrieved data, the server computing device determines that the user of the remote computing device has requested a full view of the responsive data, authenticates the remote computing device using the requestor identity via a second communication channel, and updates the generated response to comprise the full view of the retrieved data upon successful authentication of the remote computing device. The server computing device transmits the generated response to the remote computing device.

Any of the above aspects can include one or more of the following features. In some embodiments, the data access request comprises a request for data made available by one or more application programming interface (API) resources. In some embodiments, the requestor geolocation is based upon an IP address of the remote computing device. In some embodiments, the requestor identity comprises one or more access credentials associated with an operator of the remote computing device. In some embodiments, the access credentials comprise a user id, a password, a personal identification number (PIN), an authentication token, or a biometric data element.

In some embodiments, the server computing device analyzes an access profile associated with the requestor entity to determine whether the requestor identity has permission to receive a full view or a masked view of data responsive to the data query. In some embodiments, generating a response to the data access request that includes a masked view of the retrieved data comprises identifying one or more data elements in the retrieved data that comprise sensitive information, and applying a character mask to each identified data element that obscures at least a portion of the identified data element from being readable. In some embodiments, the character mask changes one or more characters in the identified data element to a different character. In some embodiments, the character mask truncates a portion of the identified data element.

In some embodiments, the server computing device analyzes the data access request to determine that the user of the remote computing device has requested a full view of the responsive data. In some embodiments, authenticating the remote computing device using the requestor identity via a second communication channel comprises instructing an authentication service to transmit an authentication challenge to a separate computing device associated with the user via the second communication channel, and receiving a response from the authentication service indicating that the separate computing device successfully completed the authentication challenge.

In some embodiments, updating the generated response to comprise the full view of the retrieved data upon successful authentication of the remote computing device comprises replacing the masked view of the retrieved data in the generated response with the full view of the data. In some embodiments, the remote computing device displays the full view of the retrieved data or the masked view of the retrieved data from the generated response in a browser application on the remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
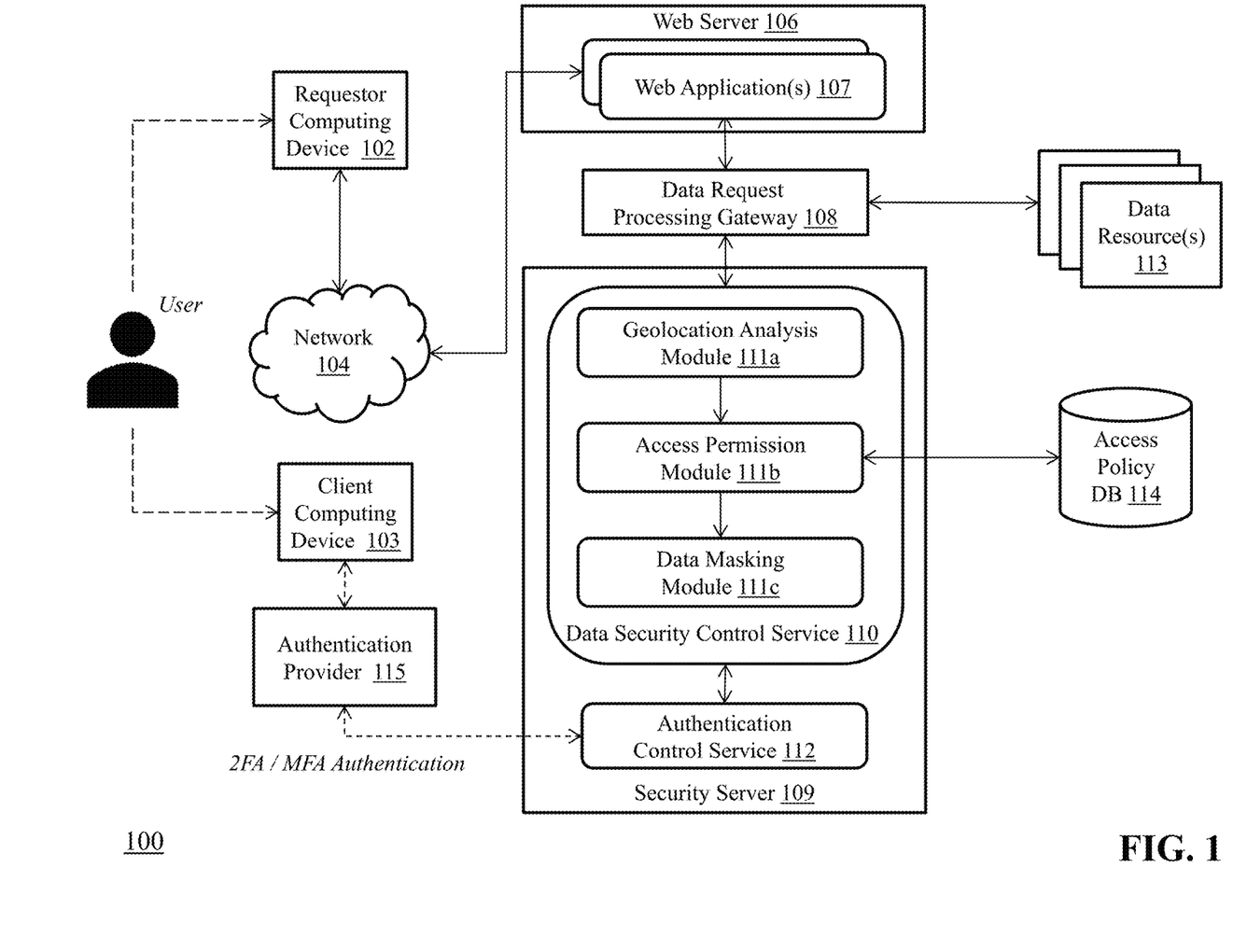
FIG. 1 is a block diagram of a system for secure geolocation-based data access control in a distributed computing environment.

FIG. 1 is a block diagram of system 100 for secure geolocation-based data access control in a distributed computing environment. System 100 includes requestor computing device 102 that is coupled to web server 106 via communication network 104. Web server 106 includes one or more web applications 107, which are coupled to data request processing gateway 108. Gateway 108 is coupled to security server 109 which includes data security control service 110 and authentication control service 112. Data security control service 110 includes geolocation analysis module 111a, access permission module 111b, and data masking module 111c. System 100 includes one or more data resource(s) 113 that are coupled to gateway 108, and access policy database (DB) 114 that is coupled to access permission module 111b. System 100 also includes client computing device 103 that is coupled to authentication provider 115.

Requestor computing device 102 connects to one or more web applications 107 of web server 106 (via network 104) in order to access functionality provided by web applications 107. In some embodiments, requestor computing device 102 establishes a connection to one or more web applications 107 via a browser application or native application installed on requestor computing device. The user at requestor computing device 102 interacts with (e.g., browses) the web applications 107 by activating links or other input elements and navigating through various functions and interfaces of the web applications 107. In some embodiments, each page or section of the web applications is associated with a particular URL. In some embodiments, requestor computing device 102 is coupled to an associated display device (not shown). For example, requestor computing device 102 can provide a graphical user interface (GUI) via the display device that is configured to receive input from a user of the device 102 and to present output (e.g., display content) to that user. Although FIG. 1 depicts a single requestor computing device 102, it should be appreciated that system 100 can comprise any number of requestor computing devices. Exemplary requestor computing devices 102 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of the system 100 can be used without departing from the scope of invention. Although FIG. 1 depicts a single requestor computing device 102, it should be appreciated that the system 100 can include any number of requestor computing devices.

As mentioned above, communication network 104 enables requestor computing device 102 to communicate with web server 106 for the purpose of accessing functionality provided by web applications 107. Network 104 may be a local network, such as a LAN, or a wide area network, such as the Internet and/or a cellular network. In some embodiments, network 104 is comprised of several discrete networks and/or sub-networks (e.g., cellular to Internet) that enable communication between requestor computing device 102 and web server 106.

Typically, requestor computing device 102 is operated by a user who interacts with web applications 107 provided by web server 106. In some embodiments, web applications 107 comprise certain functions, including data retrieval for presentation on requestor computing device 102 via a graphical user interface (GUI). The user at requestor computing device 102 establishes a connection from requestor computing device 102 to a web application 107 provided by web server 106 and interacts with features and functions of the web application 107. An exemplary web application 107 can be a browser-based application. In some embodiments, the user is authenticated to the web application 107 upon providing one or more access credentials (e.g., user id, password, PIN, authentication token, biometric data, etc.) for validation by the web server 106. Once authenticated, the user can begin to interact with web applications 107.

Web server 106 is a computing device (or set of computing devices) to which requestor computing device 102 can connect to retrieve and display digital content items (such as web pages). Web server 106 is a combination of hardware, including one or more special-purpose processors and one or more physical memory modules, and specialized software modules (such as web applications 107) that are executed by one or more processors of web server 106. Typically, a web application 107 comprises a plurality of visual and non-visual elements that make up the content transmitted and displayed to a user when, e.g., software on requestor computing device 102 connects to web server 106 via communication network 104 (e.g., Internet) and requests content from the web application 107. The elements of a web application 107 can include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a web application 107 is associated with a particular URL that identifies the page's location and provides a mechanism for retrieving the page for display on requestor computing device 102. In some embodiments, web server 106 includes a session manager which is configured to establish browsing sessions with requestor computing device 102 and record session-related information (such as pages visited, URLs accessed, timestamps, page sequencing, and the like) for each user/requestor computing device.

Data request processing gateway 108 is a computing device or a plurality of computing devices configured to handle data access requests generated by web applications 107. For example, a web application may include functionality to display certain user-related data on requestor computing device 102. When requestor computing device 102 invokes this type of function, web application 107 issues a data access request to gateway 108 to retrieve the requested data from, e.g., one or more data resources 113 coupled to gateway 108. In some embodiments, gateway 108 receives data access requests from web applications 107, processes the data access requests (e.g., according to defined policies) to direct the requests to the appropriate resources (e.g., resources 113) and returns corresponding responses to web applications 107 for display of the retrieved data on requestor computing device 102.

In some embodiments, web applications 107 interact with gateway 108 using, e.g., one or more application programming interfaces (APIs). Similarly, gateway 108 can be configured to interact with one or more data resources 113 using APIs. Generally, an API is a collection of functions, procedures, definitions, and protocols that enable integration of application software. API requests and responses can be exchanged between web applications 107, gateway, and data resources 113 using any of a number of different architectures, including but not limited to: Representational State Transfer (REST) or Simple Object Access Protocol (SOAP). In one implementation of the REST architecture that can be used in system 100, for example, resources are accessed using Uniform Resource Identifiers (URIs) and requests/responses are exchanged using Hypertext Transfer Protocol (HTTP).

Security server 109 is a computing device or plurality of computing devices, including one or more special-purpose processors and one or more physical memory modules, and specialized software modules—such as data security control service 110 and authentication control service 112—that execute on one or more of the special-purpose processors, to receive data from other components of system 100, transmit data to other components of system 100, and perform functions for secure geolocation-based data access control in a distributed computing environment as described herein.

In some embodiments, services 110 and 112 are specialized sets of computer software instructions programmed onto one or more dedicated processors in security server 109 and can include specifically-designated memory locations and/or registers for executing the specialized computer software instructions. Data security control service 110 includes geolocation analysis module 111a, access permission module 111b, and data masking module 111c. In some embodiments, modules 111a-111c are software functions performed by data security control service 110 for the purpose of secure geolocation-based data access control.

Although the services 110 and 112 are shown in FIG. 1 as executing within the same security server 109, in some embodiments the functionality of services 110 and 112 can be distributed among one or a plurality of other computing devices that are coupled to security server 109. It should be appreciated that any number of computing devices, arranged in a variety of architectures, resources, and configurations (e.g., cluster computing, virtual computing, cloud computing) can be used without departing from the scope of the invention. Further explanation of the specific processing performed by services 110 and 112, and modules 111a-111c, is throughout the specification.

Data resources 113 are repositories, databases, storage devices, or other computing systems that interface with data request processing gateway 108 (e.g., via API) to receive data queries generated by web applications 107 and retrieve and/or produce data that is responsive to the queries. Data resources 113 can be physical computing devices (such as on-premises hardware that hosts a database platform) or virtual computing resources (such as cloud-based storage frameworks that interface with offsite datacenters). In some embodiments, one or more of the data resources 113 comprise transient and/or persistent memory for storage of certain data elements relating to data requests and responses processed by gateway 108. Exemplary data resources include but are not limited to, cloud database platforms (e.g., MongoDB™, Snowflake™) and on-premises systems (e.g., Oracle Database™, Microsoft SQL Server™), among others. In some embodiments, data resources 116 are hosted in separate regions or zones of a cloud computing environment that utilize discrete, physically separate hardware components (e.g., computing devices, processors, memory modules) and network connections in a particular geographic area.

Access policy database 114 is a computing device that includes transient and/or persistent memory for storage of data access policies, user permissions and other data used in conjunction with the methods for secure geolocation-based data access control as described herein. In some embodiments, access policy database 114 can be integrated into security server 109.

In some embodiments, all or a portion of the functionality of web server 106, gateway 108, security server 109, data resources 113, and access policy database 114 can be implemented in a distributed computing environment, such as a cloud computing environment. In these embodiments, requestor computing device 102 is located in a first physical geographic location (geolocation) that is different from one or more other geolocation(s) at which web server 106, gateway 108, security server 109, data resources 113, and/or access policy database 114 are located. Exemplary platforms that can be used for the cloud computing environment include, but are not limited to, Amazon® Web Services (AWS); IBM® Cloud™; and Microsoft® Azure™ It should be appreciated that other types of computing resource distribution and configuration can be used within the scope of the technology described herein.

Authentication provider 115 is a computing device or a plurality of computing devices that provide two-factor authentication (2FA) services to authentication control module 112 of security server 109 for the purpose of secure geolocation-based data access control as described herein. In some embodiments, module 112 connects to authentication provider 115 in order to issue a secondary authentication challenge to the user via, e.g., client computing device 103 and receive a corresponding response from the user. Exemplary authentication providers 115 include, but are not limited to, Duo Mobile™ from Cisco Systems, Inc.; SecurID™ from RSA Security LLC; and Authy™ from Twilio, Inc. It should be appreciated that two-factor authentication is exemplary, and that other methods of multifactor authentication (MFA) can be used by authentication provider 115.

Client computing device 103 connects to authentication provider 115 via one or more communication networks to receive secondary authentication challenges and provide responses to the authentication challenges. Although FIG. 1 depicts a single client computing device 103, it should be appreciated that system 100 can comprise any number of client computing devices. In some embodiments, client computing device 103 can connect to authentication provider 115 via network 104 through a separate communication channel from the communication channel that is used by requestor computing device 102 to connect to web server 106. Exemplary client computing devices 103 include, but are not limited to, desktop computers, laptop computers, tablets, mobile devices, smartphones, and internet appliances. It should be appreciated that other types of computing devices that are capable of connecting to the components of system 100 can be used without departing from the scope of invention.

Figure 2:
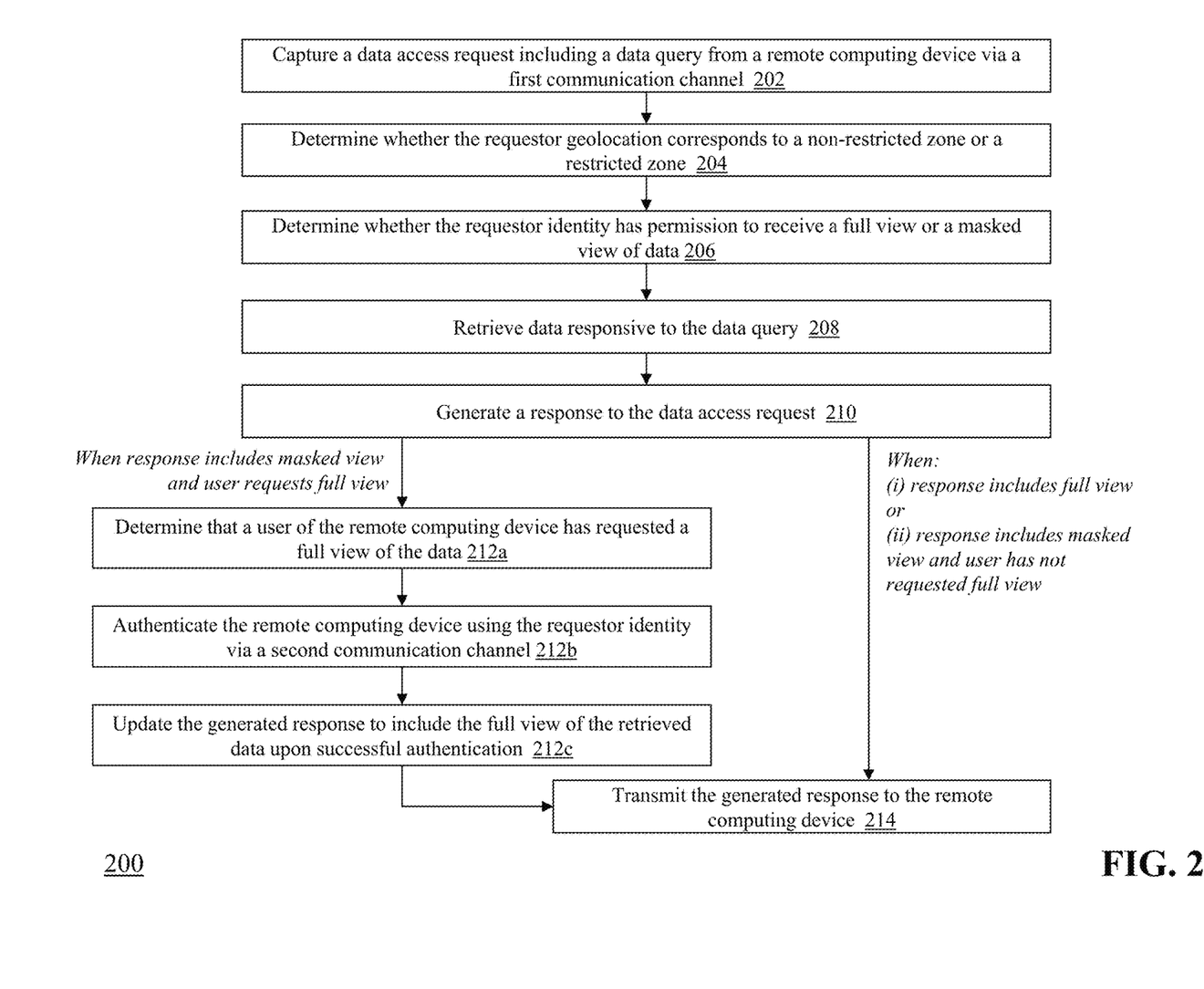
FIG. 2 is a flow diagram of a computerized method of secure geolocation-based data access control in a distributed computing environment.

FIG. 2 is a flow diagram of a computerized method 200 of secure geolocation-based data access control in a distributed computing environment, using system 100 of FIG. 1. As mentioned above, a user at requestor computing device 102 can establish a communication session with one or more web applications 107 of web server 106 in order to interact with application functionality provided by applications 107. As one example, a user at device 102 may be a customer of the organization (e.g., financial institution) that operates web server 106 and the user accesses one or more web applications 107 to view their current retirement savings account balances. In another example, a user at device 102 may be an employee of the organization that operates web server 106 and the user accesses one or more web applications 107 to request specific data that relates to their job responsibilities.

In either example, web applications 107 generate one or more data access requests that are transmitted to data request processing gateway 108. In some embodiments, each data access request includes one or more data elements associated with the specific data requested by applications 107. For example, the data access request can include a data query that defines various aspects of the requested data—e.g., an identification of data resource(s) 113 which contain the requested data, an identification of the data field(s) from each data resource 113 that are requested. The data access request can also include metadata associated with the request—such as an identification of the requestor computing device 102 and/or user, a timestamp of the request, hardware and/or software attributes associated with the requestor computing device 102 (e.g., IP address, MAC address, operating system version, device version, etc.). As mentioned above, web applications 107 can interface to gateway 108 using, e.g., an API to transmit the data access requests.

Upon receiving data access requests from web applications 107, gateway 108 processes the data access requests by analyzing the request to determine one or more actions(s) that are responsive to the request, executing those actions, and generating a response to the request. For example, gateway 108 can determine that data is being requested from one or more data resources 113, connects to those resources 113, and queries the resources 113 for the requested data.

As the gateway 108 is processing the data access request, data security control service 110 of security server is configured to intercept the data access request and perform geolocation-based access control on the request before gateway 108 provides a response to web applications 107. Data security control service 110 captures (step 202) a data access request that originated at requestor computing device 102 via a web application 107 from gateway 108. As mentioned above, in some embodiments the data access request includes a data query. The data access request can also include a requestor geolocation and a requestor identity corresponding to the user of requestor computing device 102.

In some embodiments, gateway 108 determines the requestor geolocation upon receiving the data access request from web application 107 and transmits the requestor geolocation to data security control service 110. As can be appreciated, certain governmental regulations may impose restrictions on the manner, form, and locations to which sensitive information can be disseminated. Therefore, system 110 determines a geolocation of the requesting device in order to make sure that sensitive data is properly limited or screened from distribution to certain locations. The requestor geolocation can be determined using any of a number of different techniques, including but not limited to, analyzing an IP address attributed to requestor computing device 102 and/or analyzing data from a positioning system embedded in requestor computing device 102. For example, when establishing a communication session with requestor computing device 102, web server 106 can record an IP address that is attributable to the requestor computing device 102. In some embodiments, the IP address is an address associated with the requestor computing device 102 (i.e., a local IP address). In some embodiments, the IP address is an address associated with hardware in a network that is between the requestor computing device 102 and web server 106—such as the IP address of a router operated by an internet service provider (ISP) to which requestor computing device 102 is connected. Web server 106 can include the recorded IP address as part of the data access request to gateway 108. In some embodiments, gateway 108 analyzes the recorded IP address using, e.g., a geolocation database. Generally, a geolocation database maps an IP address (or portion thereof) to a real-world physical location. Geolocation databases can utilize various methodologies to associate an IP address with a physical location, such as latency constraints, network topology, registry information, and public or private data. Typically, a geolocation database can provide data elements including continent, country, city, and time zone.

In another example, when establishing a communication session with requestor computing device 102, web server 106 can request data from a positioning system that is embedded in requestor computing device 102. Web server 106 can include the recorded positioning system data as part of the data access request to gateway 108. In some embodiments, gateway 108 analyzes the recorded positioning system data to determine a physical location of requestor computing device 102. For example, requestor computing device 102 can include GPS hardware that periodically captures the current latitude/longitude coordinates of the position of device 102. Gateway 108 can analyze the coordinates to identify an approximate real-world location of device 102.

It should be appreciated that, in some embodiments, data security control service 110 can alternatively determine the requestor geolocation from the IP address and/or device positioning system data.

Once the requestor geolocation is determined, geolocation analysis module 111a of service 110 determines (step 204) whether the requestor geolocation corresponds to a non-restricted zone or a restricted zone. As can be appreciated, access to data-especially confidential, sensitive, or personally-identifiable information (PII) often depends upon the particular location of the recipient. For example, laws and/or regulations on data security and privacy vary from country to country. In another example, certain geographical areas may be associated with high risk of data theft or other malicious activity. Therefore, data security control service 110 advantageously uses requestor geolocation to change the requestor's ability to view certain types of data. As used herein, a restricted zone is a geographic area that is not allowed to receive a full view of certain data types and a non-restricted zone is a geographic area that is allowed to receive a full view of certain data types. In some embodiments, geolocation analysis module 111a identifies the requestor geolocation as being located in a restricted zone or a non-restricted zone based upon a pre-defined list of zones. For example, the list can comprise a plurality of different geographic areas (e.g., country and/or city) that are labeled as 'restricted' or 'non-restricted.'

Access permission module 111b then determines (step 206) whether the requestor identity has permission to receive a full view of data responsive to the query or a masked view of data responsive to the query. For example, a requesting user may be entitled to view certain types of data, e.g., a customer viewing their own personal data or an employee viewing data necessary for their job functions. Module 111b analyzes the data access request received from gateway 108 to extract the requestor identity and determine a permission level associated with the requestor identity. In some embodiments, the requestor identity comprises one or more access credentials associated with the user of the remote computing device—such as user id, password, PIN, authentication token or biometric data. For example, when web server 106 authenticates the user at requestor computing device 102 when establishing a connection to web applications 107, web server 106 can capture one or more access credentials associated with the user and include them in the data access request that is transmitted to gateway 108.

Access permission module 111b connects to access policy database 114 and uses the requestor identity information to determine a data access permission level associated with the requestor. In some embodiments, access permission module 111b retrieves an access profile associated with the requestor from database 114, where the access profile includes one or more rules, filters, and/or permissions that define (i) whether the requestor is authorized to receive the requested data, (ii) what type(s) of data the requestor can access, and (iii) for certain types of data, whether the requestor has permission to receive a full view or a masked view. For example, the access profile can include a field that indicates 'full' or 'masked' for any data shown to the requestor or for only certain defined data elements (i.e., PII, financial information, etc.).

Figure 3:
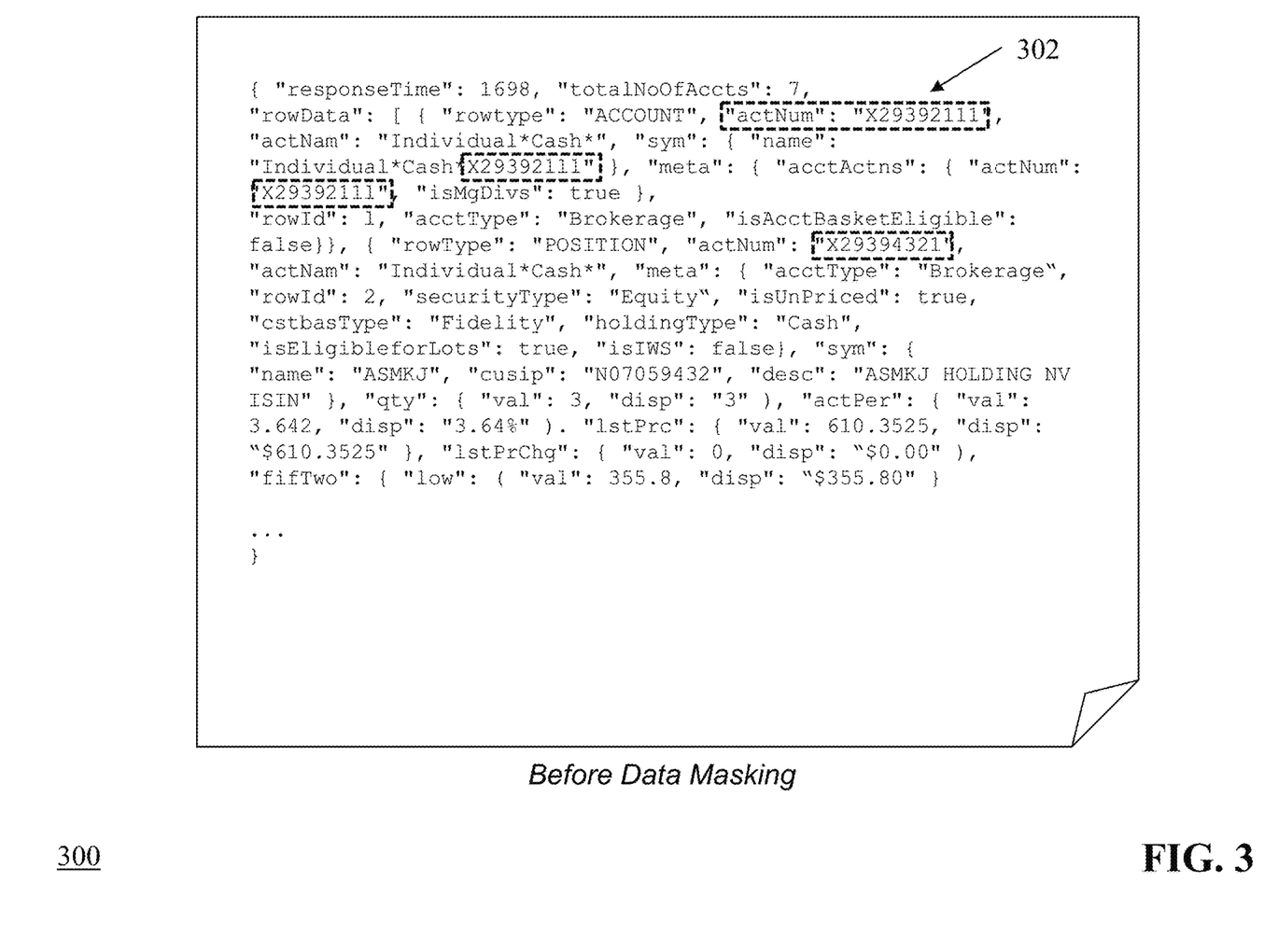
FIG. 3 is a diagram of an exemplary response message generated by gateway in response to a data access request from web application.

While service 110 determines whether the requestor geolocation is in a restricted zone or non-restricted zone, and whether the requestor identity has permission for a full view or masked view of the data as described above, gateway 108 retrieves (step 208) data from one or more data resources 113 that is responsive to the data query contained in the access request and generates (step 210) a response to the data access request comprising the retrieved data. In some embodiments, the response is generated in a structured data format (e.g., JSON, XML) where each data field comprises a key-value pair, where the key contains a label for of the data field and the value contains a string comprising the actual data element. FIG. 3 is a diagram of an exemplary response message 300 generated by gateway 108 in response to a data access request from web application 107. As shown in FIG. 3, the response message 300 comprises a plurality of data fields in a structured format, i.e., "<key>": <value>. Several data fields (e.g., field 302) correspond to or include account numbers, which are considered sensitive information. The account numbers appear in response message 300 without any alteration or obfuscation.

Data security control service 112 receives the generated response from gateway 108 and applies data masking module 111c to the generated response. Data masking module 111c first evaluates whether the requestor geolocation is in a non-restricted zone based on the output from geolocation analysis module 111a. Module 111c then evaluates whether the requestor identity has permission to receive a full view of the responsive data based on the output from access permission module 111b.

When the requesting geolocation is in a non-restricted zone and the requestor identity has permission to receive a full view of the responsive data, module 111c instructs data request processing gateway 108 to transmit (step 214) the generated response to the corresponding web application 107 without any modifications (for example, the full view shown in response message 300 of FIG. 3). Web application 107 then generates a graphical user interface for display of the data responsive to the query. In this situation, none of the responsive data has been masked because the requestor is entitled to a full view of the data.

When either (a) the requesting geolocation is in a non-restricted zone and the requestor identity does not have permission to receive a full view of the responsive data or (b) the requesting geolocation is in a restricted zone, module 111c identifies one or more data elements in the retrieved data that comprise sensitive information and applies a masking function to the responsive data in the generated response to obscure at least a portion of the responsive data. As mentioned above, sensitive information can include data such as PII, financial information, legal information, or other types of confidential data. To identify sensitive information, data masking module 111c can scan the structured data in the generated response to identify data fields with key value(s) (e.g., "acctNum," "SSN", etc.) that have been defined as comprising sensitive data. When module 111c identifies a sensitive data field, module 111c can apply a masking function to the value in the key-value pair which results in the complete value being obscured or unreadable.

Figure 4:
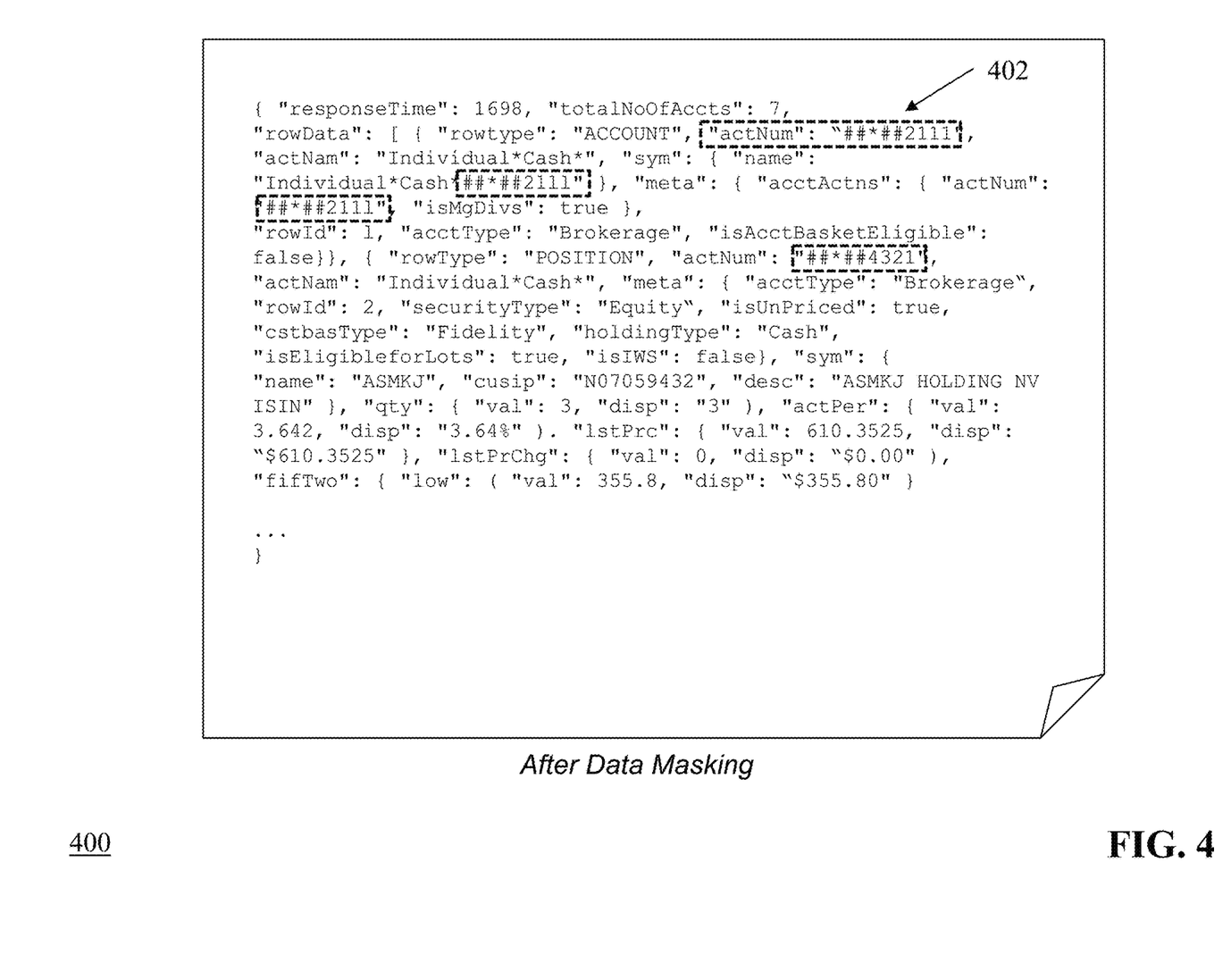
FIG. 4 is a diagram of an exemplary response message generated by gateway in response to a data access request from web application which has been masked by data masking module.

In some embodiments, the masking function comprises a character mask that is applied to each identified data element based upon the key type of the data field. For example, module 111c can be configured to recognize that data fields with a key type of "acctNum" have a value in the format of 'X' followed by nine digits (e.g., 'X123456789'). Module 111c can apply a character mask that replaces the first five digits in the account number with a predefined string of symbols, such as 'X##*##6789' for the above example. Module 111c then updates the generated response to include the masked data. In some embodiments, instead of or in addition to masking one or more characters, module 111c can truncate one or more characters from the value of a given data field, replace the value with a null value, or delete the data field from the generated response. FIG. 4 is a diagram of an exemplary response message 400 generated by gateway 108 in response to a data access request from web application 107 which has been masked by data masking module 111c. As shown in FIG. 4, the response message 400 contains several data fields (e.g., field 402) correspond to or include account numbers. Because these fields are considered sensitive information, module 111c has replaced five digits of each account number that appears in the message with a series of symbols.

In instances when data security control service 110 determines that the response should include a masked view of the sensitive data, the requestor may still need a full view of this data. For example, an employee may travel to a country that is recognized by system 100 as a restricted zone. However, the employee's job function requires them to have continued access to sensitive data. When this employee submits a data access request via web application 107, gateway 108 determines that the employee's geolocation is restricted and service 110 generates a masked view of the responsive data. In some embodiments, the data access request can include metadata (e.g., a field in the header of the request message) that indicates to service 110 the user has requested a full view of the responsive data. For example, web application 107 can be configured to receive input from the user of requestor computing device 102 (e.g., via an interactive GUI element such as a checkbox or button) that instructs the web application 107 to include a specific key-value pair in the data access request to request a full view (e.g., "fullViewRequested": true). In other embodiments, web application 107 and/or gateway 108 can automatically add the key-value pair based upon the requestor identity or the web application 107 and/or application function that is being used by requestor computing device 102.

When the response to the data access request is generated with a masked view, data security control service 110 determines (step 212a) that a user of requestor computing device 102 has requested a full view of the data. As noted above, the data access request can include a specific key-value pair for the full view request, and service 110 can analyze this key-value pair to confirm that the user has requested a full view of the responsive data. Then, service 110 instructs authentication control service 112 of security server 109 to authenticate (step 212b) requestor computing device 102 by initiating a secondary authentication challenge to the user via a separate communication channel. In some embodiments, authentication control service 112 uses the requestor identity and/or access profile from access policy database 114 to identify a computing device (i.e., client computing device 103) associated with the user and to which the secondary authentication challenge should be sent. For example, the user may have registered their mobile phone with web server 106 to receive multifactor authentication challenges via a native application installed on the mobile device. Authentication control service 112 identifies the preferred or registered device(s) to be used in MFA/2FA and transmits instructions to authentication provider 115 regarding the secondary authentication challenge. Authentication provider 115 issues an authentication challenge to the user via client computing device 103. For example, authentication provider 115 can transmit a message containing a transitory one-time passcode (OTP) to client computing device 103. The user must enter the OTP into web application 107 via requestor computing device 102 in order to successfully complete the authentication process. Web application 107 transmits the user's response to the authentication challenge to authentication control service 112, which validates the response and authenticates the user to receive a full view of the responsive data.

Authentication control service 112 then instructs data masking module 111c of data security control service 110 to update (step 212c) the generated response which contains the masked view of data to comprise the full view of the responsive data. Module 111c replaces the masked versions of sensitive data in the response with the unmasked versions and instructs gateway 108 to transmit (step 214) the updated response to web application 107. Web application 107 then generates a graphical user interface for display of the data responsive to the query.

Figure 5:
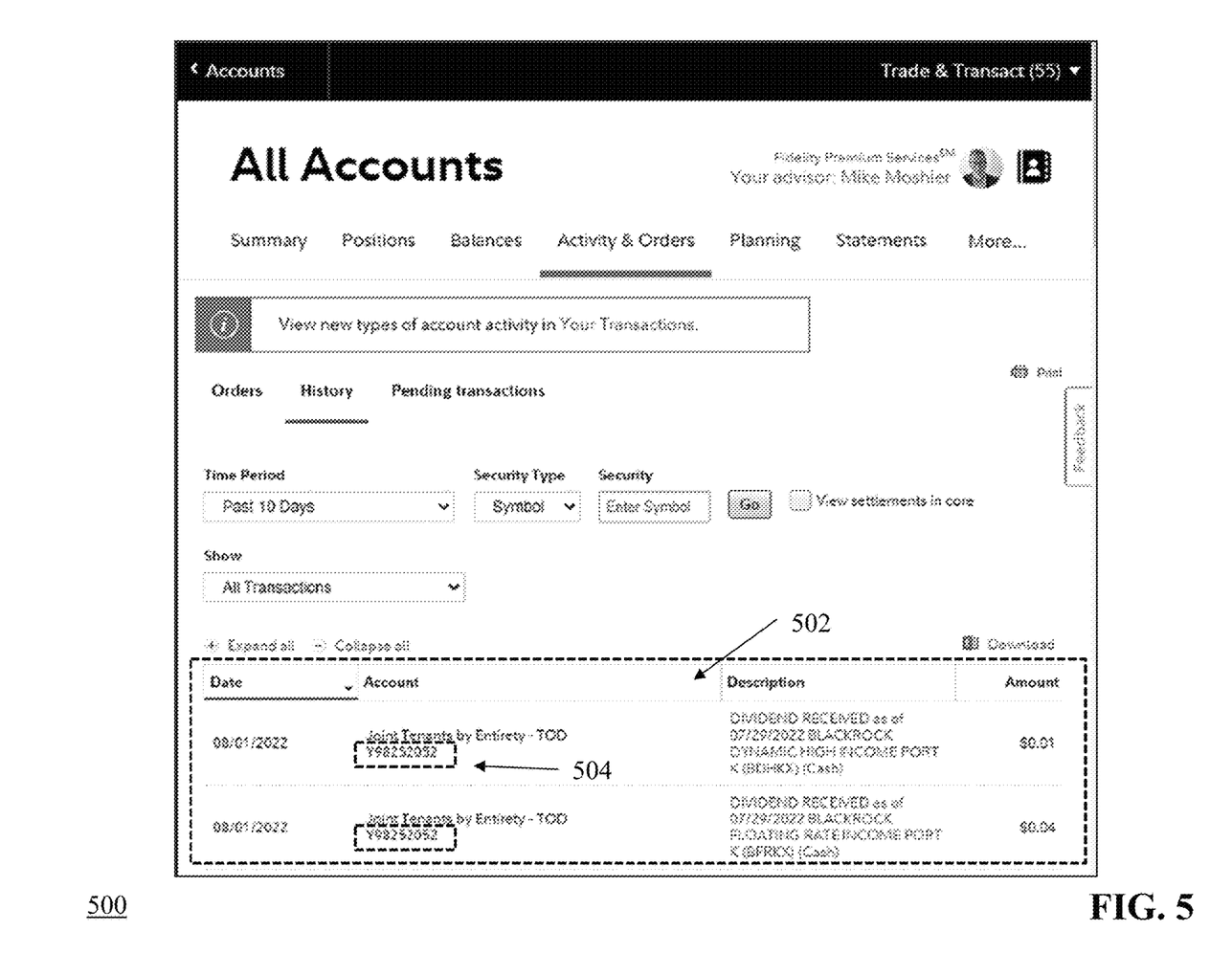
FIG. 5 is a diagram of an exemplary graphical user interface generated by web application that includes a full view of responsive data.

FIG. 5 is a diagram of an exemplary graphical user interface 500 generated by web application that includes a full view of responsive data. As shown in FIG. 5, the user interface 500 comprises an Activity & Orders view for All Accounts. The interface includes table section 502 that lists all transactions for the past ten days. Each row in the table corresponds to an account transaction, and includes the account number (e.g., 504) for the transaction. In this example, system 100 generated a response to the data access request that includes a full view of the responsive data and therefore the user interface 500 displays the full, unmasked account number 504 (i.e., 'Y98252052').

Figure 6:
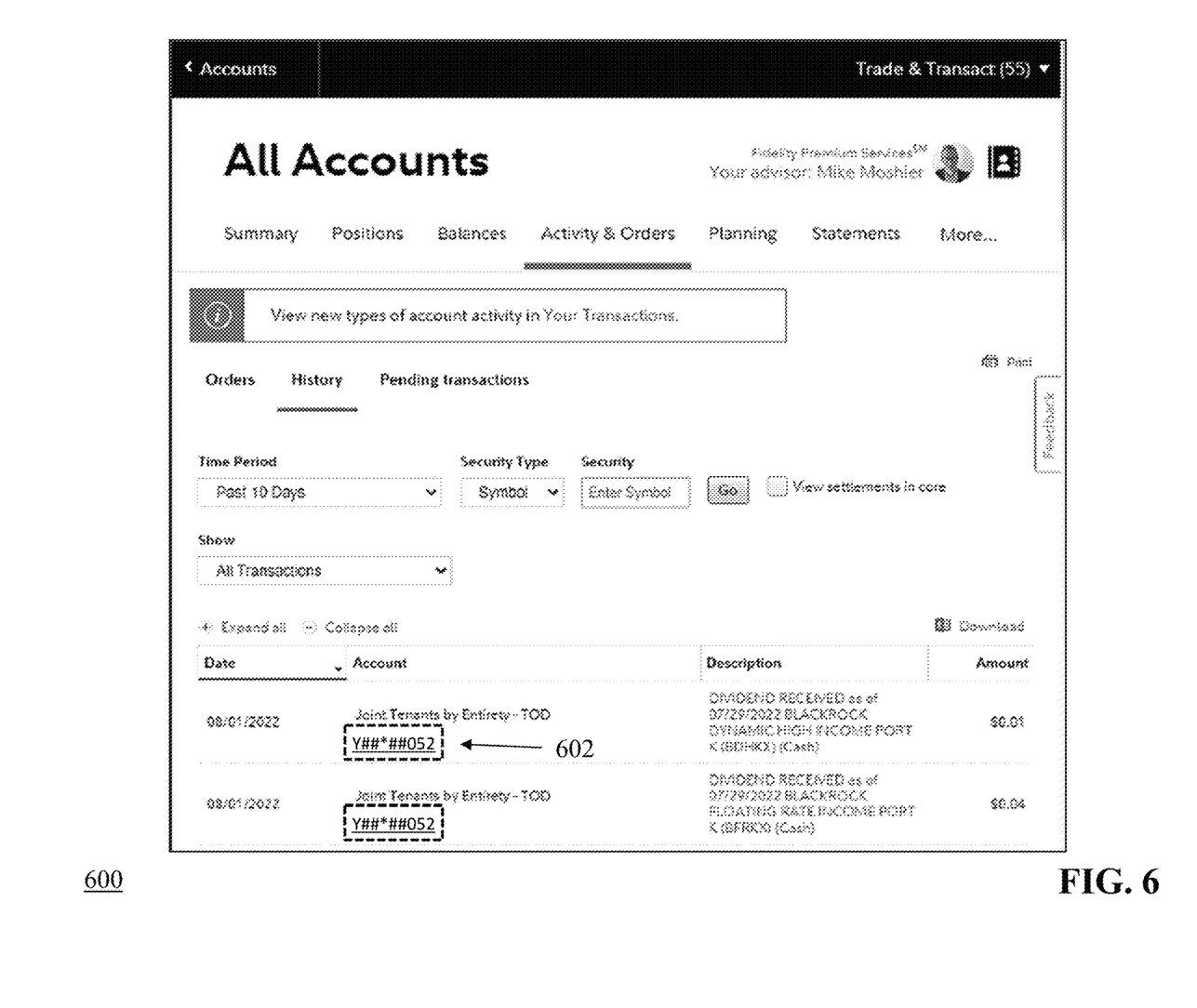
FIG. 6 is a diagram of an exemplary graphical user interface generated by web application that includes a masked view of responsive data.

FIG. 6 is a diagram of an exemplary graphical user interface 600 generated by web application that includes a masked view of responsive data. As shown in FIG. 6, the user interface 600 comprises an Activity & Orders view for All Accounts. The interface includes table section 602 that lists all transactions for the past ten days. Each row in the table corresponds to an account transaction, and includes the account number (e.g., 604) for the transaction. In this example, system 100 generated a response to the data access request that includes a masked view of the responsive data and therefore the user interface 600 displays the masked account number 604 (i.e., "Y##*##052').

Another important feature of the methods and systems described herein is the ability of system 100 to continually learn from prior data access decisions in order to streamline subsequent data access request processing. In some embodiments, data security control service 110 can include a learning module that identifies access patterns over time by comparing a known baseline geolocation/zone from which a requestor computing device 102 regularly accesses data (e.g., determined from prior interactions) to a geolocation/zone of a current data access request from the device 102. In some embodiments, a user/requestor computing device 102 can be assigned to a particular geolocation where the user is based and service 110 recognizes that geolocation as a baseline geolocation. For example, a user may be based in New York (which is in a non-restricted zone) and the majority of their data access requests originate in New York. Therefore, system 100 can generate responses to the user's data access requests that comprise a full view of the requested data. When the user/device 102 moves to a different geolocation and submits data access requests to web applications 107, service 110 can compare the new geolocation to the baseline and determine whether (i) the user is now in a restricted zone and (ii) whether data retrieved pursuant to the user's data access requests should be masked in view of the location change. In some embodiments, service 110 can determine that the new geolocation is still in a non-restricted zone and automatically continue to provide a full view of requested data. In some embodiments, service 110 can determine that an access pattern of the geolocations associated with the user's recent data requests indicate that the geolocation has changed repeatedly to locations that do not correspond to the baseline location. In this case, service 110 can decide to mask sensitive data requested by the user (without the ability for the user to override) until the user returns to the baseline geolocation. In some embodiments, service 110 can optionally require the user to complete the 2FA/MFA process described above each time they make a new data access request, until the user returns to the baseline geolocation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® Web Services™ (AWS), Microsoft® Azure™, IBM® Cloud™).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for secure geolocation-based data access control in a distributed computing environment, the system comprising a server computing device having a memory for storing computer-executable instructions and a processor that executes the computer-executable instructions to:
    capture a data access request from a remote computing device via a first communication channel, the data access request including a data query, a requestor geolocation, and a requestor identity corresponding to a user of the remote computing device;
    determine whether the requestor geolocation corresponds to a non-restricted zone or a restricted zone;
    determine whether the requestor identity has permission to receive a full view or a masked view of data responsive to the data query;
    compare the requestor geolocation to a baseline geolocation associated with the requestor identity, including determining whether the requestor identity is associated with a plurality of recent prior data access requests from geolocations other than the baseline geolocation;
    retrieve data responsive to the data query;
    generate a response to the data access request, the response including:
        a full view of the retrieved data when (i) the requestor geolocation corresponds to a non-restricted zone or the requestor geolocation matches the baseline geolocation, and (ii) the requestor identity has permission to receive the full view, or
        a masked view of the retrieved data when (i) the requestor geolocation corresponds to a restricted zone and the requestor geolocation does not match the baseline geolocation or (ii) the requestor identity has permission to receive the masked view; and
    when the generated response comprises a masked view of the retrieved data:
        determine that the user of the remote computing device has requested a full view of the responsive data by evaluating a key-value pair stored in the data access request; and
        decline the full view request when the requestor identity is associated with a plurality of recent prior data access requests from geolocations other than the baseline geolocation, or
        authenticate the remote computing device using the requestor identity via a second communication channel and update the generated response to comprise the full view of the retrieved data upon successful authentication of the remote computing device when the requestor identity is not associated with a plurality of recent prior data access requests from geolocations other than the baseline geolocation; and
    transmit the generated response to the remote computing device.

2. The system of claim 1, wherein the data access request comprises a request for data made available by one or more application programming interface (API) resources.

3. The system of claim 1, wherein the requestor geolocation is based upon an IP address of the remote computing device.

4. The system of claim 1, wherein the requestor identity comprises one or more access credentials associated with an operator of the remote computing device.

5. The system of claim 4, wherein the access credentials comprise a user id, a password, a personal identification number (PIN), an authentication token, or a biometric data element.

6. The system of claim 1, wherein the server computing device analyzes an access profile associated with the requestor entity to determine whether the requestor identity has permission to receive a full view or a masked view of data responsive to the data query.

7. The system of claim 1, wherein generating a response to the data access request that includes a masked view of the retrieved data comprises:
    identifying one or more data elements in the retrieved data that comprise sensitive information; and
    applying a character mask to each identified data element that obscures at least a portion of the identified data element from being readable.

8. The system of claim 7, wherein the character mask changes one or more characters in the identified data element to a different character.

9. The system of claim 7, wherein the character mask truncates a portion of the identified data element.

10. The system of claim 1, wherein authenticating the remote computing device using the requestor identity via a second communication channel comprises:
   instructing an authentication service to transmit an authentication challenge to a separate computing device associated with the user via the second communication channel; and
   receiving a response from the authentication service indicating that the separate computing device successfully completed the authentication challenge.

11. The system of claim 1, wherein updating the generated response to comprise the full view of the retrieved data upon successful authentication of the remote computing device comprises replacing the masked view of the retrieved data in the generated response with the full view of the data.

12. The system of claim 1, wherein the remote computing device displays the full view of the retrieved data or the masked view of the retrieved data from the generated response in a browser application on the remote computing device.

13. The system of claim 1, wherein when the requestor identity is associated with a plurality of recent prior data access requests from geolocations other than the baseline geolocation, the server computing device declines to process all subsequent full view requests from the requestor identity until the requestor returns to the baseline geolocation.

14. A computerized method of secure geolocation-based data access control in a distributed computing environment, the method comprising:
   capturing, by a server computing device, a data access request from a remote computing device via a first communication channel, the data access request including a data query, a requestor geolocation, and a requestor identity corresponding to a user of the remote computing device;
   determining, by the server computing device, whether the requestor geolocation corresponds to a non-restricted zone or a restricted zone;
   determining, by the server computing device, whether the requestor identity has permission to receive a full view or a masked view of data responsive to the data query;
   comparing, by the server computing device, the requestor geolocation to a baseline geolocation associated with the requestor identity, including determining whether the requestor identity is associated with a plurality of recent prior data access requests from geolocations other than the baseline geolocation;
   retrieving, by the server computing device, data responsive to the data query;
   generating, by the server computing device, a response to the data access request, the response including:
      a full view of the retrieved data when (i) the requestor geolocation corresponds to a non-restricted zone or the requestor geolocation matches the baseline geolocation, and (ii) the requestor identity has permission to receive the full view, or
      a masked view of the retrieved data when (i) the requestor geolocation corresponds to a restricted zone and the requestor geolocation does not match the baseline geolocation or (ii) the requestor identity has permission to receive the masked view; and
   when the generated response comprises a masked view of the retrieved data:
      determining, by the server computing device, that the user of the remote computing device has requested a full view of the responsive data by evaluating a key-value pair stored in the data access request; and
      declining, by the server computing device, to process the full view request when the requestor identity is associated with a plurality of recent prior data access requests from geolocations other than the baseline geolocation, or
      authenticating, by the server computing device, the remote computing device using the requestor identity via a second communication channel and updating the generated response to comprise the full view of the retrieved data upon successful authentication of the remote computing device when the requestor identity is not associated with a plurality of recent prior data access requests from geolocations other than the baseline geolocation; and
   transmitting, by the server computing device, the generated response to the remote computing device.

15. The method of claim 14, wherein the data access request comprises a request for data made available by one or more application programming interface (API) resources.

16. The method of claim 14, wherein the requestor geolocation is based upon an IP address of the remote computing device.

17. The method of claim 14, wherein the requestor identity comprises one or more access credentials associated with an operator of the remote computing device.

18. The method of claim 17, wherein the access credentials comprise a user id, a password, a personal identification number (PIN), an authentication token, or a biometric data element.

19. The method of claim 14, further comprising analyzing, by the server computing device, an access profile associated with the requestor entity to determine whether the requestor identity has permission to receive a full view or a masked view of data responsive to the data query.

20. The method of claim 14, wherein generating a response to the data access request that includes a masked view of the retrieved data comprises:
   identifying one or more data elements in the retrieved data that comprise sensitive information; and
   applying a character mask to each identified data element that obscures at least a portion of the identified data element from being readable.

21. The method of claim 20, wherein the character mask changes one or more characters in the identified data element to a different character.

22. The method of claim 20, wherein the character mask truncates a portion of the identified data element.

23. The method of claim 14, wherein authenticating the remote computing device using the requestor identity via a second communication channel comprises:
   instructing an authentication service to transmit an authentication challenge to a separate computing device associated with the user via the second communication channel; and
   receiving a response from the authentication service indicating that the separate computing device successfully completed the authentication challenge.

24. The method of claim 14, wherein updating the generated response to comprise the full view of the retrieved data upon successful authentication of the remote computing device comprises replacing the masked view of the retrieved data in the generated response with the full view of the data.

25. The method of claim 14, further comprising display, by the remote computing device, the full view of the retrieved data or the masked view of the retrieved data from the generated response in a browser application on the remote computing device.

26. The method of claim 14, further comprising when the requestor identity is associated with a plurality of recent prior data access requests from geolocations other than the baseline geolocation, declining, by the server computing device, to process all full view requests from the requestor identity until the requestor returns to the baseline geolocation.

* * * * *